United States Patent [19]
Horton

[11] 3,781,884
[45] Dec. 25, 1973

[54] FUZE HAVING A HIGH RESISTANCE TO COUNTERMEASURES

[76] Inventor: Billy M. Horton, 9712 Rensington Pky., Kensington, Md.

[22] Filed: Apr. 23, 1958

[21] Appl. No.: 730,759

[52] U.S. Cl. .............. 343/7 PF, 343/14, 343/17.5
[51] Int. Cl. ............................................. G01s 9/24
[58] Field of Search .................. 343/7, 14, 17.5, 343/5 SA, 7 PF, 7 ED; 102/70.2 P

[56] References Cited
UNITED STATES PATENTS

| 3,419,861 | 12/1968 | Resnik et al. | 343/7 ED |
| 2,958,862 | 11/1968 | Rey | 343/14 |
| 2,842,764 | 7/1958 | Harvey | 343/14 |

FOREIGN PATENTS OR APPLICATIONS

| 724,555 | 2/1955 | Great Britain | 343/14 |

Primary Examiner—Malcolm F. Hubler
Attorney—W. E. Thibodeau, F. E. McGee, J. D. Edgerton, N. Cass, S. J. Ratondi and A. T. Dupont

EXEMPLARY CLAIM

2. A noise-modulated radio proximity fuze comprising in combination: a transmitter radiating energy towards a target, a source of white noise having a gaussian probability distribution of amplitudes with a mean amplitude of zero and a predetermined peak-to-peak noise voltage, a linear frequency shaping network connected to said source to frequency-shape said noise to a predetermined frequency spectrum, means connecting said network to said transmitter so that the frequency-shaped noise linearly frequency modulates said transmitter, means for receiving the energy reflected from the target, mixer means to which the received energy and a sample of the transmitted energy are fed, said mixer means producing a signal which is the instantaneous difference-frequency between transmitted and received energy and in which the frequency spectrum of the mixer output signal is dependent upon target distance amplifier means connected to the output of said mixer means for amplifying the mixer output signal, discriminator means connected to the output of said amplifier, for producing an output signal which is a distance correlation of the frequency spectrum of the mixer output signal firing circuit means connected to the output of said discriminator means, said firing circuit means producing a firing pulse when the output of said discriminator means corresponds to a predetermined firing distance, and detonation means connected to the output of said firing circuit means so as to provide detonation when said firing circuit produces a firing pulse.

13 Claims, 3 Drawing Figures

PATENTED DEC 25 1973    3,781,884

FUZE HAVING A HIGH RESISTANCE TO COUNTERMEASURES

The invention described herein may be manufactured and used by or for the Government for governmental purposes without the payment to me of any royalty thereon.

This invention relates to radio proximity fuzes in general and more particularly to an improved radio proximity fuze in which the transmitted energy is noise-modulated.

The ability of a fuzing system to resist countermeasures is becoming of very great importance in the fuzing art. In fact, beause of the rapid progress in countermeasure techniques, this feature may well become the single most important consideration in fuze design.

Distance-measuring or target sensing fuze systems which depend upon reflection of energy from a target usually based on a predictable relationship between the transmitted energy and the reflected energy received from a target. In systems which employ periodic modulation there is a predictable relationship between the transmitted and received waves. The periodicity of such a signal enables an observer with proper equipment to predict in a relatively short time the spectrum of the transmitted signal. This may be used to great advantage by those conducting countermeasures against the system.

If a relatively unpredictable aperiodic signal such as noise is used to modulate the transmitted energy, it may be expected that the resistance of the system to countermeasures will be greatly increased. The chief reason for this is that the relationship between the transmitted and received signals is no longer easily predictable and an observer must examine the transmitted signal over a relatively long time before any prediction of its spectrum is possible. By this time, the missile will normally have reached its target and have done its damage before any countermeasures could be taken.

Because of the non-predictable relationship occurring between the transmitted and returning signals of a noise-modulated system, it was generally thought that accurate distance information could not be obtained. In the present invention this difficulty is overcome by properly choosing the noise signal and the interpretation means. By so doing, a noise-modulated system is obtained which retains all the advantages of noise modulation, and yet, provides for the accurate prediction of distance. A further advantage of this noise-modulated system is that the noise spectrum may be chosen so that the system is free of the ambiguities that make periodic systems susceptible to early firing.

In a typical embodiment of the invention, the noise-modulated system comprises a transmitter oscillator which is frequency-modulated by frequency-shaped random noise, a balanced mixer whose output is the instantaneous difference-frequency between transmitted and received energy, and a receiver whose discriminator output voltage depends on the spectral distribution of the difference-frequency signals.

An object of this invention is to provide an improved radio proximity fuze.

Another object is to provide an improved radio proximity fuze which has a very high resistance to countermeasures.

A further object of this invention is to provide a radio proximity fuze having no ambiguities in distance measurement.

Still another object is to provide a noise-modulated fuze system which detonates at a very accurate distance from the target.

The specific nature of the invention, as well as other objects, uses, and advantages thereof, will clearly appear from the following description and from the accompanying drawing, in which.

Figure 1:
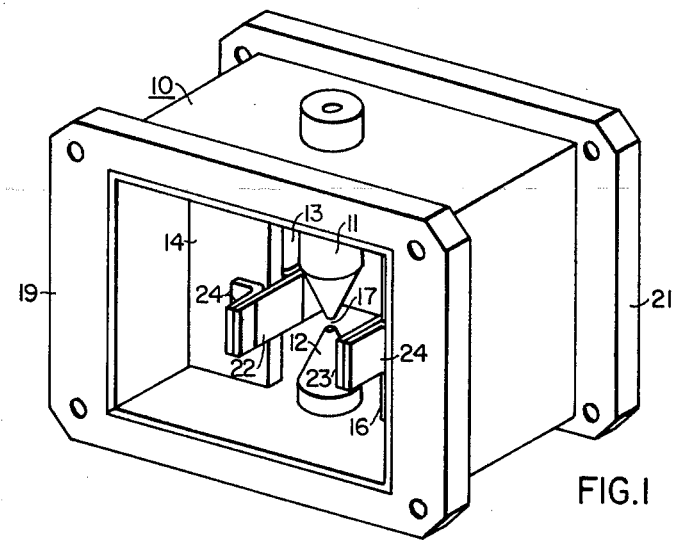
FIG. 1 is a block diagram of a noise-modulated fuzing system in accordance with the invention.

In the noise-modulated fuze system of the present invention, the statistical properties of the relationship between the signal being transmitted and the one returning from the target are used to convey distance information. Some insight into the theories and principles of this noise-modulated system may be obtained from the following discussion.

Suppose a system radiates energy which is modulated in amplitude, phase, or frequency by a random signal such as noise. If a target very close to the transmitter reflects back some of the energy with a very short time delay, the transmitter will have had only a very short time to make a change in amplitude, phase or frequency, as the case may be. For a target at a greater distance, the time delay of the return signal will be greater, and there will be an increased probability that a large change will have occurred. If a comparison is made between the outgoing and incoming signals, a comparison signal will be obtained having statistical properties which are dependent upon distance. At zero distance (no time delay) the transmitted and return signals are identical, and we find perfect correlation between them. At very large distances, the return signal will seem to be almost completely unrelated to what is being transmitted, i.e., the transmitted and return signals are uncorrelated.

The way in which correlation between the transmitted and return signals changes from perfect correlation at zero distance to lack of any correlation at very great distances depends upon the frequency components in the random function, i.e., the spectrum of the noise. If only very-low-frequency components are present, the the transmitted signal cannot change rapidly in time, and the correlation between the outgoing and return signals changes very slowly with increasing distance. If, however, very-high-frequency components are present, the transmitter can make rapid changes in amplitude, phase, or frequency, and the correlation between the two signals goes rapidly toward zero as the time delay between transmitte d and return signals increases.

It should be noted that if the modulating function is truly a random function, there is some probability that the outgoing and returning signals can be very different even for a very close target, but such large differences are not as likely as smaller ones. In a system being disclosed here, only the average relationship between the outgoing and returning signals is used to determine distance. The accuracy with which the distance determination is made depends upon the length of time during which the relationship is measured as well as upon the accuracy of system parameters.

Correlation of a function with itself is called its "correlation function" or "autocorrelation" in communication theory, and "serial correlation" in the field of statistics. In an actual system, one of the signals can be modified by noise, Doppler effect, and other forms of interference, hence the correlation between the outgoing and return signals is not precisely its "autocorrelation" or "correlation function." However, since the system is based on the principle implied by these terms, they are appropriate.

The correlation-function principle has the possibility of being used in systems which employ radio waves, light, sound, or other effects as carrier. It is only necessary that the random function be impressed upon the outgoing energy and detected in that which is reflected back from the target.

For a given type of modulation in a given system, the random noise signal and its frequency spectrum can be chosen so that the statistical properties of the comparison signal are adaptable for interpretation by suitable electronic circuitry so as to enable accurate distance information to be obtained.

Figure 2:
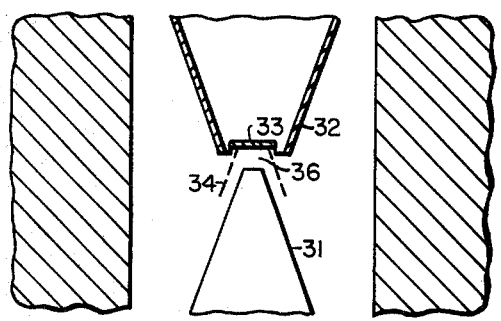
FIGS. 2 and 3 are block diagrams of two specific noise-modulated fuzing systems in accordance with FIG. 1.
Figure 4:
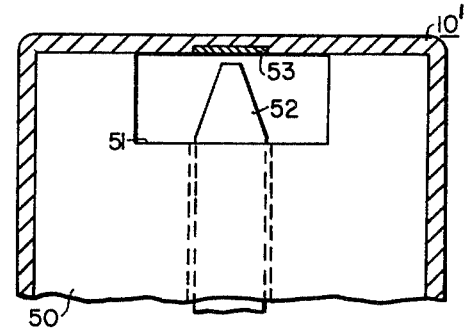
Figure 3:
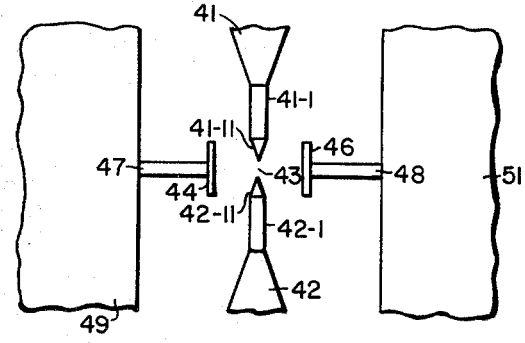

Because in a frequency-type of modulation system, a comparison of the transmitted and received signals is readily obtained by mixer action, this type of system is preferable and is so used in the embodiments of this invention shown in FIGS. 1—3. In these embodiments the transmitted and received noise signals of a frequency-modulated system are compared in a mixer. A comparison signal is then obtained which is the instantaneous difference-frequency between the transmitted and received signals. For the modulating noise signal there is preferably chosen a random noise signal having a gaussian probability distribution of amplitudes with a mean amplitude of zero and a spectral distribution which is frequency-shaped by a linear filter network. The statement that this random noise signal has a gaussian probability distribution of amplitudes (also known in the art as a "normal" distribution) means that the probability, at any randomly selected time, that the noise signal has an instantaneous amplitude in the range from $f(t)$ to $[f(t) + df(t)]$, is given by the expression:

$$\frac{1}{\sigma \sqrt{2\pi}} e^{\left[-\frac{(f(t)-\bar{f})^2}{2\sigma^2} df(t)\right]}.$$

In this expression, $\bar{f}$ is the long-term arithmetic average value of $f(t)$, $\sigma$ is the long-term root-mean-square variation of $f(t)$ from its average value, and $df(t)$ is the incremental range (chosen to be vanishingly small) in which the probability of occurrence of $f(t)$ is sought. The general form of the above expression is well known; see, for example, *Frequency Analysis, Modulation and Noise* by Stanford Goldman, McGraw-Hill, 1948, at pages 206 and 302. The random noise generating mechanism employed herein, described in greater detail infra, is one in which large numbers of independent randomly occurring events are added together to give the noise, and therefore the distribution of amplitudes approaches the gaussian distribution. This tendency to approach the gaussian distribution for a large number of independent events (i.e., a large sample) is termed the "Central Limit Theorem" in statistics. See pages 322–324 of the Goldman text, supra. The frequency-shaping filter network is provided with a conventional "blocking" capacitor so that the filter network has no d.c. transmission. Therefore, the long-term average $\bar{f}$ of the noise signal, after it is passed through this filter, will be zero, i.e., the mean amplitude of the probability distribution of amplitudes is zero. Also, a desired band of frequency components of the noise signal are passed by the linear filter network while any other frequency components of the noise signal are blocked by the filter in conventional manner. Because the noise signal at the output of the filter therefore has a particular desired frequency spectrum, it is said to be "frequency-shaped" by the filter network. Since the noise signal will continue to have a gaussian probability distribution of amplitudes as long as the noise signal is passed through linear networks and devices, only linear filter networks are used for frequency shaping, and the modulation relationship in the transmitter is also chosen to be linear. Therefore, if the probability distribution of amplitudes of the modulating function is gaussian, the probability distribution of frequencies of the transmitted signal and the received signal is also gaussian. The instantaneous difference-frequency signal obtained from the mixer will thus also be gaussian with a mean frequency of zero. This follows because the difference between two gaussian functions is itself a gaussian function. Such a gaussian difference-frequency comparison signal from the mixer will consist of a noise signal having its maximum energy density at zero frequency, with the energy per unit bandwidth decreasing with increasing frequency. This type of comparison signal is very well suited for interpretation by electronic circuitry.

It can be shown both mathematically and empirically that the frequency spectrum of the gaussian comparison signal depends upon the target distance and the peak-to-peak amplitude and the frequency spectrum of the modulating noise signal.

That is, let F(t) be a dimensionless continuous random-noise function with a Gaussian distribution of amplitudes and no dc component. The correlation function $\psi(\tau)$ of F(t) is defined by $$\chi(\tau) = \left(\frac{1}{K}\right) \lim_{T \to \infty} \frac{1}{T} \int_0^T F(t)F(t-\tau)dt \quad (1)$$

where the normalizing factor K is given by $$K = \lim_{T \to \infty} \frac{1}{T} \int_0^T [F(t)]^2 dt \quad (2)$$

The amplitude spectrum $S(f)$ of a function $G(t)$ which is equal to F(t) in the interval $O \leq t \leq T$ and zero outside the interval is:

$$S(f) = \int_0^T F(t)e^{-i2\pi ft}dt \quad (3)$$

and the corresponding normalized "power" spectrum $w(f)$ is $$w(f) = \left(\frac{1}{K}\right) \lim_{T \to \infty} \frac{2|S(f)|^2}{T} \quad (4)$$

considering only positive frequencies. The correlation function is related to the power spectrum by the Wiener-Khintchine relation $$\chi(\tau) = \int_0^\infty w(f) \cos 2\pi f\tau \, df \quad (5)$$

and $$w(f) = 4 \int_0^\infty \chi(\tau) \cos 2\pi f\tau \, d\tau \quad (6)$$

We see that a system which performs the operation of correlating $F(t)$ with $F(t - \tau)$, as indicated by (1), will behave in accordance with (5), i.e., its distance dependence will be governed by the power spectrum $w(f)$ of the random noise. It can be seen from (6) that some desired system behavior $\psi(\tau)$ can be postulated, and the corresponding noise power spectrum determined. Many types of correlation function, however, lead to unrealizable, or impractical power spectra.

We now consider several special cases of noise spectra and give the corresponding correlation functions. In each case, we use a normalized power spectrum i.e., a spectrum for which $$\int_0^\infty w(f) df = 1 \quad (7)$$

and a normalized $\psi(\tau)$ in order that $\psi(0) = 1$.

Case I-Ideal Band-Pass Filter: Let
$w_1(f) = (1/f_2 - f_1)$ for $f_1 \leq f \leq$
$= 0$ for $f < f_1$
$= 0$ for $f > f_2$ \quad (8)

Using (5) and integrating, we obtain $\psi_1(\tau) = [1/(f_2-f_1) 2\pi\tau] [\sin 2\pi f_2 \tau - \sin 2\pi f_1 \tau]$ \quad (9)

When $f_1 = 0$, the low-pass filter case, $\psi_1(\tau) = (1/2\pi f_2\tau)\sin 2\pi f_2\tau$ \quad (10)

Both of these functions oscillate, and thus have the disadvantage that a certain value of $\psi(\tau)$ may correspond to more than one value of $\tau$. When $f_1$ and $f_2$ are almost equal, $\psi_1(\tau)$ looks like a very slightly damped sine wave. As the bandwidth is increased, the "damping" increases. When $f_1 = 0$, $\psi_1(\tau)$ appears highly damped.

Case II-Exponential Filter: Now suppose $w_2(f) = ae^{-af}$ \quad (11)

where $a$ is a constant.

Again using (5) and integrating, we obtain $\psi_2(\tau) = [1/1 + (2\pi\tau/a)^2]$ \quad (12)

Here we have a correlation function which decreases monotonically with increasing $\tau$ for $\tau > 0$ hence ambiguity in the relation between $\tau$ and $\psi_2(\tau)$ is avoided. It would be impossible, however, to obtain a noise spectrum conforming exactly to (11) and would be difficult to approximate.

Case III-Low-Pass RC Filter: In this case we assume that the noise spectrum is that which would be produced if "white" noise from a generator of zero output impedance is passed through a noise filter. The output power spectrum is $$w_3(f) = [4/\lambda/(2\pi f)^2 + (1/\lambda)^2] \quad (13)$$

where $\lambda = R_1 R_2 C/(R_1 + R_2)$ is the time constant of the noise-shaping network. If we substitute (13) into (5) and integrate, we obtain $$\psi_3(\tau) = e^{-\tau/\lambda} \quad (14)$$

This correlation function, the inverse of Case II, is a monotonically decreasing function of delay time $\tau$, hence avoiding ambiguities in the relationship between $\psi(\tau)$ and $\tau$. It also has the advantage that the noise spectrum can be shaped with a simple circuit.

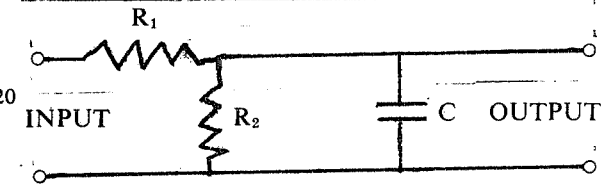

FIG. 1-Noise filter for Case III. Case IV-Gaussian Filter With Maximum at Zero Frequency:

$$w_4(f) = (1/f_c) \sqrt{2/\pi} \, e^{-f^2/2f_c^2} \quad (15)$$

i.e., the power spectrum follows a one-sided normal distribution with maximum density at zero. This leads to $$\psi_4(\tau) = e^{-2\pi^2 f_c^2 \tau^2} \quad (16)$$

which also follows the normal distribution with maximum at zero. Such a correlation function may be especially adapted to some applications where, for example, greater range sensitivity is desired at a particular range. The required power spectrum $w_4(f)$ would, as in Case II, however, be impossible to obtain exactly.

Case V-Gaussian Filter With Maximum at $\bar{f}$: In this case we assume that the noise power follows a normal distribution with mean value at $\bar{f}$, and has a standard deviation (in frequency) of $\sigma$, i.e.,:

$$w_5(f) = (1/\sigma \sqrt{\pi}) e^{-(f-\bar{f})^2/2\sigma^2} \quad (17)$$

If we put (17) in (5) and integrate, we obtain an approximate expression for the corresponding correlation function $\psi_5(\tau)$ which is valid when $\bar{f} >> \sigma$, $$\psi_5(\tau) = [\cos 2\pi\tau\bar{f}] \, e^{-2\pi^2\tau^2\sigma^2} \quad (18)$$

an oscillating function with a Gaussian envelope.

The required power spectrum of the noise may be obtained approximately with tuned circuits, but $\psi_5(\tau)$ has the disadvantage that it oscillates and hence has ambiguities in the relationship between $\psi(\tau)$ and $\tau$.

Of the several cases of noise spectrum which have been presented three have led to correlation functions which give no ambiguities, but two of these may require a complex noise band-shaping network while the other requires only a resistance-capacitance network. Its correlation function $\psi_3(\tau)$, (14) is $$\psi_3(\tau) = e^{-\tau/\lambda}$$

(14a)

If one wants $\psi_3(\tau)$ to have the value $1/e$ (i.e., $\tau=\lambda$) for a distance of 100 feet, then $$\lambda = 2 \times 100/c \approx 2 \times 10^{-7}$$

seconds, approximately. The corresponding half-power point frequency for the RC network is about 0.8 mc. This case has the property that a certain percentage change in range gives a constant percentage change in $\psi_3(\tau)$ for all ranges. This is shown by the fact that $$\frac{\dfrac{d}{d(\tau/\lambda)} \chi_3(\tau)}{\chi_3(\tau)} = \frac{-e^{-\tau/\lambda}}{e^{-\tau/\lambda}} = -1 \qquad (19)$$

A disadvantage of the correlation function is that it has its maximum value when $\tau = 0$. This means that a small amount of leakage from the transmitting antenna to the receiving antenna might obscure a return signal of greater strength but with a greater time delay. Similarly, a small return from a near target may obscure a large target farther out. This is discussed more fully in later sections. This property of the correlation function led to the search for a function which is complementary to the correlation function, i.e., one which starts at zero for zero distance and increases monotonically to a maximum value at infinite distance. "Anticorrelation" Distance Measurement In the correlation function system, a function was multiplied by its delayed version, and the average value of this product was obtained. (See (1).) The average value of this product is a maximum when the delay is zero. In the "anticorrelation" system to be discussed now, we find the mean square value of the difference between the value of a function and its delayed version.

When the time delay $\tau$ is zero, the instantaneous difference is zero, hence the mean-square difference is zero, and the effect of leakage from transmitter to receiver is lessened.

The "anticorrelation" function $H(\tau)$ will be defined by $$H(\tau) = \lim_{T \to \infty} \frac{1}{2T} \int_0^T [F(t) - F(t-\tau)]^2 dt$$

$$= \lim_{T \to \infty} \left[ \frac{1}{2T} \int_0^T [F(t)]^2 dt + \frac{1}{2T} \int_0^T [F(t-\tau)]^2 dt \right.$$

$$\left. - \frac{1}{T} \int_0^T F(t) F(t-\tau) dt \right]$$

If $(F(t))$ is normalized, i.e., in (2), $K = 1$, then $$He^{-\tau/2} = 1 - \lim_{T \to \infty} \frac{1}{T} \int_0^T F(t) F(t-\tau) dt \qquad (21)$$

or $$H(\tau) = 1 - \psi(\tau). \qquad (22)$$

Thus we see that $H(\tau)$, defined as half the mean-square difference between normalized $F(t)$ and $F(t-\tau)$, is the complement of their mean product $\psi(\tau)$.

Using (22) and the correlation functions obtained in Cases I-V in the previous section, we have immediately, from (22), $H(\tau)$ for the noise spectra considered there.

For a noise band which is shaped by the RC network, (Case III)

$$H_3(\tau) = 1 - e^{-\tau/\lambda} \qquad (23)$$

If a response of $$H_3(\tau) = 1 - 1/e$$

is desired for a target at 100 feet, $\lambda$ must be approximately $2 \times 10^{-7}$ seconds, which again corresponds to a half-power frequency of about 0.8 mc.

At very small values of $\tau/\lambda$, $H_3(\tau)$ is approximately proportional to $\tau/\lambda$; thus the output of this system is, for near targets, nearly a linear function of distance.

The fractional range sensitivity is:

$$\frac{\dfrac{d}{d(\tau/\lambda)} H_3(\tau)}{H_3(\tau)} = \frac{e^{-\tau/\lambda}}{1 - e^{-\tau/\lambda}} = \frac{1}{e^{\tau/\lambda} - 1} \qquad (24)$$

When $\tau = 0$ this is unlimited, and as $\tau \to \infty$, it approaches the value zero. Thus the system has its highest sensitivity at the shortest distances. When $\tau/\lambda = 1$, the fractional range sensitivity has the value 0.58.

Increasing the target distance, the peak-to-peak noise voltage, or the frequency band of the noise signal will increase the frequency spectrum of the instantaneous difference-frequency comparison signal. Similarly, decreasing any one of the above-enumerated factors will decrease the frequency spectrum of the comparison signal. Since the characteristics of the noise signal are ordinarily fixed in any given system, changes in target distance will appear as an expansion or compression of the frequency spectrum of the comparison signal. The terms "expansion" and "compression" refer, respectively, to an increase and a decrease of the upper frequency limit of the band of frequencies forming the comparison signal frequency spectrum. This compression and expansion can be interpreted by suitable circuitry to give accurate distance information. It should be noted that by proper choice of the frequency spectrum of the modulating noise signal, freedom from ambiguities in distance measurement may be obtained.

FIG. 1 shows a block diagram of a fuzing system which is frequency-modulated by frequency-shaped gaussian noise, the transmitted and received signals being compared as described above. In FIG. 1, a random noise generator 10 is used to produce "white" noise (i.e., having constant noise power per unit bandwidth) which has a gaussian probability distribution of amplitudes with a mean amplitude of zero. Such a random noise generator could comprise a system which uses the gaseous discharge of a thyratron such as a 6D4 to provide the noise function.

The white noise from the random generator 10 is fed to a linear frequency shaping network 11 which is used to provide a suitable frequency spectrum for the modulating noise signal. The frequency spectrum of the modulating noise signal, as stated previously, is one factor in determining the frequency spectrum of the instantaneous difference-frequency comparison signal. The reason for this can be seen as follows: If only very low frequency components are present, then the transmitted signal cannot change rapidly and the probability of a large change in frequency between transmitted and received signals for a given distance will be small, and a compressed difference-frequency spectrum will result. However, if very high frequencies are present in the noise signal, then the transmitted signal may change rapidly and the probability of a large change in frequency between transmitted and received signals for the same distance is considerably higher, and a more expanded difference-frequency spectrum is obtained. The spectrum of the noise signal also is a factor in determining whether or not there will be ambiguities in the distance measurement. For a given system, therefore, the characteristics of the linear frequency shaping network 11 are chosen to give the performance desired.

The random noise generator 10 and the frequency shaping network 11 comprise the modulator 13 which frequency modulates the F-M transmitter 14. As stated previously the voltage-frequency relationship in the transmitter 14 is linear. Energy radiated from the transmitting antenna 16, is reflected from a target 17, and the returning energy picked up by the receiving antenna 18. A sample of the transmitted energy $f_t$ is obtained by means of an attenuator 20 and fed (as the local oscillator signal) to a mixer 19, where it is mixed with the returned signal $f_r$ to produce a signal having an instantaneous difference frequency $\Delta f$ at the output of the mixer 19.

The instantaneous difference frequency signal $\Delta f$ is passed from the output of the mixer 19 to an amplifier 21 for amplification. Ideally, the amplifier 21 should respond to the full range of difference frequencies $\Delta f$. For practical reasons, and because deviations from ideal performance are permissible in most applications, the response of the amplifier 21 will usually be dictated by the specific characteristics desired from the system.

The amplified difference-frequency signal $\Delta f$ obtained from the output of the amplifier 21 is fed to a discriminator 22 whose output voltage depends on the frequency spectrum of the difference-frequency signal $\Delta f$. Various types of discriminators may be used for the discriminator 22 depending on the characteristics desired.

Figure 5:
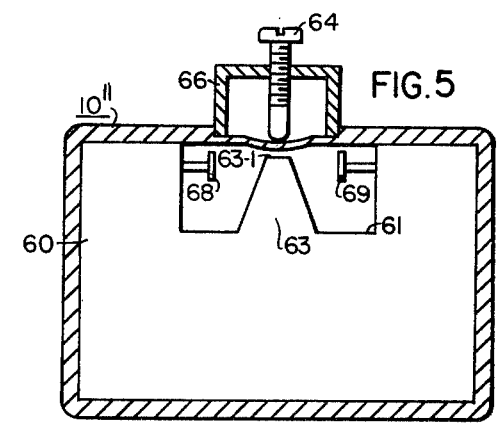

One type of discriminator 22 which may be used, makes a distance measurement by providing an output voltage which is proportional to the average magnitude of the instantaneous difference-frequency $\Delta f$. Those skilled in the art will understand that to accomplish this, a discriminator has to provide a linear relationship between its output voltage and the input difference frequency $\Delta f$. A conventional digital or "clip-and-count" discriminator is one example of a discriminator which would give this linear relationship between input frequency and output voltage. The "clip-and-count" discriminator normally comprises a limiter for changing the input signal into a square wave signal, a differentiating network to convert the zero crossings of the square wave into pulses, a rectifier for converting the pulses into rectified current, and an integrating or storage device such as a capacitor for accumulating the pulses over a given time interval. As a result, the output voltage corresponds to the average value of the pulse repetition rate and thus also to the average magnitude of the instantaneous frequency of the input signal. Discriminators of this type are well known in the art and have been used in frequency monitoring equipment for radio broadcast stations. A particular example of this general type of discriminator is given in "F.M. Monitor Has Pulse Counter Discriminator" by C. A. Cady, *F.M. and Television*, Vol. 7, No. 12, December, 1947 at pages 18–21 and 36. See particularly FIGS. 5 and 6 at page 19. Using a discriminator 22 of this type, which determines the average magnitude of the instantaneous difference-frequency $\Delta f$, with a given peak-to-peak amplitude and frequency spectrum of the frequency-modulating noise voltage, the output voltage of the discriminator 22 will have a predictable value dependent upon target distance.

A second type of discriminator 22 which may be used operates on a spectrum-ratio principle which is well known to those skilled in the art. In this type of discriminator 22, distance is measured by determining the shift in the total frequency spectrum of the difference-frequency function $\Delta f$ resulting from distance changes. In this type of discriminator 22, the input frequency components are separated into two groups: those above and those below a frequency called the "crossover frequency." Such a discriminator 22 may comprise two tuned circuits, a high frequency tuned circuit which passes those frequencies higher than the "crossover" frequency, and a low frequency tuned circuit which passes those frequencies which are lower than crossover. The frequency components falling into the band of each tuned circuit may then be rectified and averaged and the two averaged voltages continuously compared by "bucking" them against each other through a common resistor. The voltages may be arranged so that the lower frequency components contribute a positive voltage and the higher frequency components contribute a negative voltage to the discriminator output. The characteristics of the two tuned circuits may then be adjusted so that for large distances, where the frequency spectrum is very wide, the discriminator output is negative. For a given peak-to-peak amplitude and frequency spectrum of the frequency-modulating noise voltage, a decrease in target distance will cause the frequency spectrum to become more compressed so that more energy is in the lower frequency part of the spectrum. When the target distance is such that the contribution of the high frequency tuned circuit equals the contribution of the low frequency tuned circuit, the output of the discriminator 22 will be zero. As the target distance continues to decrease, the spectrum will become more compressed and the output of the discriminator 22 will begin to go positive. The point at which the discriminator output passes from negative to positive is called the crossover point and may conveniently be used as a firing signal. The distance at which this crossover occurs has been found to be accurately predictable.

The decision and firing circuits 23 applying a firing signal to the detonator 24 when the output of the discriminator 22 has a predetermined value which corresponds to a predetermined target distance or position at which functioning is desired. For this first type of discriminator described, which makes a distance measurement by providing an output voltage which is dependent on the average magnitude of the instantaneous difference frequency $\Delta f$, a comparison type of decision and firing circuit may be used. In such a decision and firing circuit, the discriminator output voltage is compared with a comparison voltage and a firing voltage sent to the detonator 24 when the comparison voltage is equal to the discriminator output voltage. For the spectrum-ratio type of discriminator, the decision and firing circuit may comprise a circuit which sends a firing signal to the detonator 24 when the discriminator output passes through crossover; that is, the point at which the discriminator output passes from negative to positive.

FIGS. 2 and 3 are schematic diagrams of two specific noise-modulated fuzing systems, radiating at X-band frequencies, and designed in accordance with FIG. 1, which have proved to be particularly successful.

The system of FIG. 2 uses a noise signal which has a gaussian frequency spectrum obtained by means of the linear gaussian filter 11a; (i.e., $e^{-x^2}$ where x is proportional to frequency). This gaussian spectrum has been found to make the distance measurement free from ambiguities. The system of FIG. 2 also uses a clip and count discriminator 22a which produces an output voltage which is dependent on the average magnitude of the instantaneous difference frequency $\Delta f$ as described previously. A comparison and firing circuit 23a sends a firing pulse to the detonator 24 when the output of the clip and count discriminator 22a has a predetermined value.

The system of FIG. 3 uses a noise signal which is obtained by passing the random noise from the generator 10 through a linear 90 kilocycle filter 11b having a bandwidth of 5 kilocycles. This noise spectrum, like the gaussian spectrum, also gives freedom from ambiguities in distance measurement. As shown, the system of FIG. 3 uses a spectrum-ratio discriminator 22b which operates as described previously. The decision and firing circuit 23b sends a firing pulse to the detonator 24 when the output of the spectrum-ratio discriminator 22b passes through crossover.

The foregoing discussion shows that a system which impresses noise modulation on a carrier, and then correlates it with the modulation reflected from a target, is able to determine distance to the target. It has been shown that measurement of the meansquare difference between the modulation on the transmitted energy and the modulation on the received energy gives a system output which is the complement of the correlation function. Any type of system capable of performing the above operations can be used to measure distance.

Modulating a particular characteristic of the transmitted energy always involves some incidental modulation of other characteristics, and this leads to practical difficulties in achieving good system sensitivity. Some of the transmitted energy invariably arrives at the receiver input terminals with a very short time delay and tends to obscure small signals. Target signal levels vary over a very wide range, may obscure one another, may cause abnormal operation of parts of the system, or may require balancing or normalizing operations which are not practical to achieve.

Leakage from the transmitter to the receiver is conveniently avoided by operating the receiver at either different times and/or frequencies from those being used by the transmitter. Pulse systems accomplish this in time by turning off the transmitter during signal receiving times. Conventional FM altimeters accomplish this by making the receiver very insensitive to frequencies in the modulation waveform, and thus they are insensitive to signals having a small time delay. Practical noise-modulated systems must deal with these same problems.

An AM correlation-function system would give an output which would depend on signal strength as well as target distance, unless complete normalizing of the return signal were accomplished. This implies an essentially perfect automatic gain control in the receiver, if system output is to be dependent upon distance only. Thus such a system is not very practical.

In an AM correlation-function system, the response $\psi(\tau a, \tau b)$ to two signals of amplitude $a$ and $b$, having delay times $\tau a$ and $\tau b$ respectively, would be: $\psi(\tau a, \tau b)$ $$\equiv \lim_{T \to \infty} \frac{\frac{1}{T} \int_0^T F(\tau)[aF(t-\tau_a)+bF(t-\tau_b)]dt}{\sqrt{K}\,[aF(t-\tau_a)+bF(t-\tau_b)]_{rms}} \quad (25)$$

where the terms in the denominator of (25) serve to normalize $\psi(\tau a, \tau b)$. We can obtain from (25) and from the definition of (1), that $\psi(\tau a, \tau b) = \sqrt{K}\,[a\psi(\tau a)+ b\psi(\tau b)/aF(t-\tau a)+ bF(t-\tau b)]rms$ (26) which is a weighted mean of $\psi(\tau a)$ and $\psi(\tau b)$ where $a$ and $b$ are the weighting factors. The contributions of signals $a$ and $b$ to $\psi(\tau a, \tau b)$ have the ratio, $Rab = [a\psi(\tau a)/b\psi(\tau b)]$.

(27)

This result shows how a weak signal of strength $a$ can obscure a larger signal of strength $b$, if $\psi(\tau a)$ is much larger than $\psi(\tau b)$. In a radiating system where the strength of signal declines rapidly with distance, this may be a very objectionable property.

An AM anticorrelation system must obtain the difference between two normalized functions, otherwise system output will again depend upon signal strength as well as target distance. Normalizing the received signal is so difficult that such a system is not very practical.

Interference between two signals in an AM anticorrelation system is somewhat involved, and an analysis will not be given here because it is of no immediate practical interest.

An FM correlation type system has the advantage that a comparison of the frequencies of the transmitted and returning signals can be made essentially independent of the signal level. The "capturing effect" of an FM receiver which greatly suppresses receiver output for all but the largest signal, can either be beneficial or detrimental, depending on relative signal levels.

An FM correlation-function system must convert the frequency modulation on the returning signal to some convenient form, say voltage, in order to multiply it by the modulation being impressed on the transmitted signal. Such a conversion would involve either 1) a discriminator operating at the carrier frequency or 2) a mixer and local oscillator to heterodyne the signal to a lower frequency and a discriminator at the lower frequency. Such a system could be made, but like the AM systems, would be very sensitive to leakage from transmitter to receiver and would be substantially more complex than a conventional FM altimeter.

A simpler system using noise modulation is an FM anticorrelation system. A sample of the transmitted signal is used as the local oscillator in a conventional mixer, as is done in conventional FM altimeters. The mixer output has an instantaneous frequency equal to the magnitude of the instantaneous frequency difference of the transmitted and received signals. Thus, direct conversion to a conveniently low frequency is accomplished without a separate local oscillator. The type of receiver best suited to handling the difference-frequency signal depends upon the application. If a wide-band limiting receiver is used, it will preserve the "zero crossings" of the mixer output. When the modulation index of the mixer output is high, the zero crossings give a good measure of the average magnitude of the instantaneous difference frequency. This high modulation index corresponds to large phase excursions of the difference-frequency phasor between changes in sign of the instantaneous difference frequency. Large phase excursions occur when the transmitter is swept monotonically over a wide frequency range and/or when the time delay of the received signal is large. If the rate of zero crossing is converted to a fluctuating voltage, squared, and averaged, the system output will behave, to the extent that zero crossing rate is a good measure of instantaneous frequency, as an anticorrelation system.

We now take note of the fact that the random noise function $F(t)$ assumed has a Gaussian probility distribution of amplitudes. If the frequency-deviation characteristic of the transmitter is linear, the transmitted signal will have a Gaussian probability density with mean value at the carrier frequency. The returning signal will, for a noisefree, stationary target likewise have a Gaussian probability with the same mean value. Since the difference frequency, $$\Delta\omega = \omega(t) - \omega(t - \tau) \qquad (28)$$

is the difference of frequencies having a Gaussian distribution, it too will have a Gaussian probability distribution, but with zero mean. The mixer does not, however, preserve the algebraic sign of the difference frequency, so the mixer output is a signal whose probability distribution of instantaneous frequency is a one-sided Gaussian distribution, with its maximum at an instantaneous frequency of zero.

Since the instantaneous difference frequency follows a Gaussian distribution, the average squared difference frequency $\overline{\Delta\omega^2}$ is related to the average magnitude of the difference frequency $\overline{|\Delta\omega|}$ by $$\overline{|\Delta\omega|} = \sqrt{(2/\pi)(\overline{\Delta\omega^2})} \qquad (29)$$

Because of this relationship, which holds as long as $\Delta\omega$ has a Gaussian probability distribution, the FM anticorrelation system can, by measuring the average magnitude of the difference frequency, determine through (29) the mean-square frequency difference which is in turn related to the correlation function and the noise power spectrum. This noise-modulated system is no more complex than a conventional altimeter.

The precise relationship between mean magnitude of the difference frequency and the noise power spectrum will now be obtained. Suppose the transmitter is frequency modulated so that the instantaneous frequency deviation of the transmitter is $\omega(t)$. Let $$F(t) = \omega(t)/\omega(t)rms, \qquad (30)$$

where $$\lim_{T \to \infty} \frac{1}{T} \int_0^T \omega(t) dt = 0,$$

and $$\omega(t)_{rms} = \{\overline{\omega(t)^2}\}^{1/2}, \qquad (31)$$

then $$H(\tau) = \lim_{T \to \infty} \frac{1}{2T} \int_0^T \left[ \frac{\omega(t)}{\omega(t)_{rms}} - \frac{\omega(t-\tau)}{\omega(t)_{rms}} \right]^2 dt \qquad (32)$$

$$= \frac{1}{[\omega(t)_{rms}]^2} \lim_{T \to \infty} \frac{1}{2T} \int_0^T [\omega(t) - \omega(t-\tau)]^2 dt \qquad (33)$$

$$= \frac{1}{[\omega(t)_{rms}]^2} \lim_{T \to \infty} \frac{1}{2T} \int_0^T [\Delta\omega]^2 dt \qquad (34)$$

Using (29)

$$H(\tau) = \frac{\pi\{\overline{|\Delta\omega|}\}^2}{4\omega(t)_{rms}^2} \qquad (35)$$

But $$H(\tau) = 1 - \chi(\tau)$$

$$= 1 - \int_0^\infty w(f) \cos 2\pi f \tau df$$

Hence $$\{\overline{|\Delta\omega|}\}^2 = \frac{4}{\pi} [\omega(t)_{rms}]^2 \left\{ 1 - \int_0^\infty w(f) \cos 2\pi f \tau df \right\}$$

or $$\overline{|\Delta\omega|} = \frac{2}{\sqrt{\pi}} \omega(t)_{rms} \sqrt{1 - \int_0^\infty w(f) \cos 2\pi 4\tau df} \qquad (37)$$

which shows the way in which this system depends upon the power spectrum $w(f)$ of the modulating noise.

If you modulate (frequency modulation) with noise whose normalized power spectrum is $w(f)$, with a root mean square deviation angular frequency of $\omega(t)_{rms}$ then, for a returning signal which has been delayed by $\tau$ seconds, the average magnitude of the angular difference frequency is given by the equation (37). It is noted that $\Delta\omega_{rms}$ and $\overline{|\Delta\omega|}$ as used here differ by a factor of $\sqrt{2/\pi}$.

If the RC filter of Case III is used to shape the noise spectrum, the mean magnitude of the difference frequency is $$\overline{|\Delta\omega|} = \frac{2}{\sqrt{\pi}} \omega(t)_{rms} \sqrt{1 - e^{-\tau/\lambda}} \qquad (38)$$

The normalized mean magnitude $m_1$ of the difference frequency for this case is $$m_1 = \frac{\overline{|\Delta\omega|}}{\omega(t)_{rms}} = \frac{2}{\sqrt{\pi}} \sqrt{1 - e^{-\tau/\lambda}} \qquad (39)$$

The system output changes most rapidly at short time delays.

In case IV the normalized mean magnitude $m_2$ of the difference frequency is $m_2 = 2/\sqrt{\pi} \sqrt{1 - e^{-2\pi^2 f c^2 \tau^2}}$ (40)

It is to be understood that although this invention has been illustrated in the form of a noise-modulated fuze which is frequency-modulated by random noise, the invention is applicable to many other fields. Any system which employs radio waves, light, or sound as carrier is susceptible to noise-modulation techniques and may be adapted to operate in accordance with the present invention.

A new type of modulation function, random noise, has been introduced in distance-measuring systems. It makes possible a new class of system output-to-distance relations, and in particular, it is possible to have an average output which is an unambiguous function of distance. Systems having an output which is an arbitrary function of distance are not possible because of physical realizability and practicality considerations. System characteristics can easily be changed by switching filters for the modulating noise. Using simple filters, it is possible to make a system which has its highest sensitivity at the shortest ranges, and this makes such a system particularly suited for blind landing applications.

These systems do not depend upon the detailed relationship between transmitted and returning signals, hence some time averaging must be used for accuracy. Usually, however, the averaging time required is not large.

Many variations of the basic system are possible, for example a servo can be used to control some system parameter and thus maintain constant spectrum into the receiver. The simplest noise-modulated distance measuring system is frequency modulated, and is no more complex than a conventional FM altimeter.

It will be apparent that the embodiments shown are only exemplary and that various modifications can be made in construction and arrangement within the scope of the invention as defined in the appended claims.

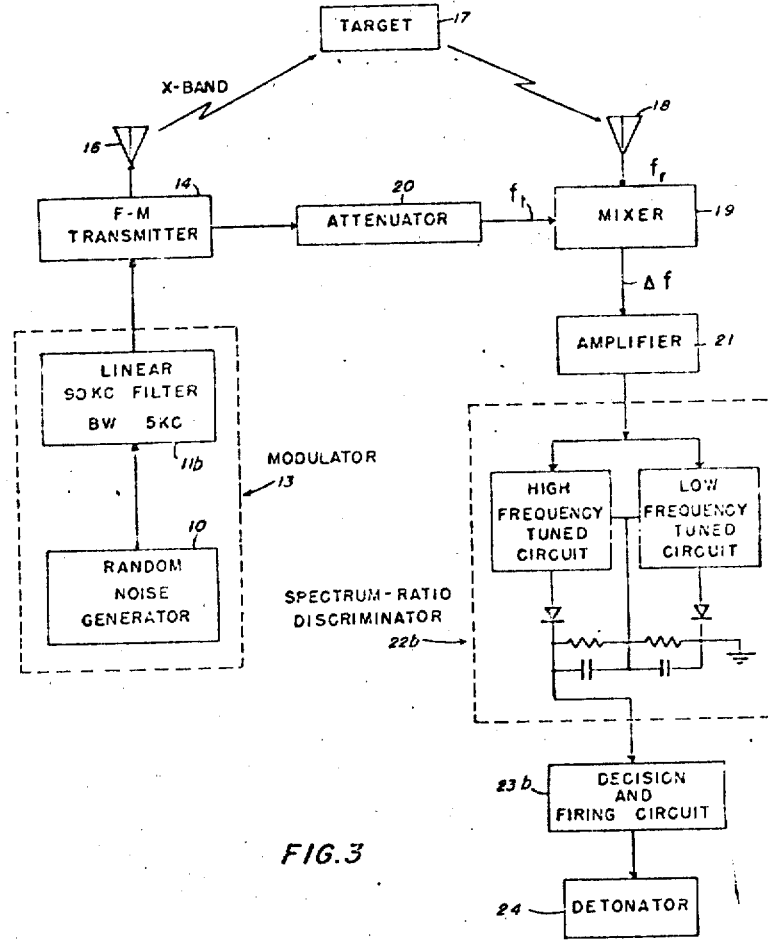

I claim as my invention:

1. A noise-modulated distance measuring device comprising in combination: a transmitter radiating energy towards a target, a noise source connected to said transmitter so as to noise-modulate the energy radiated, means for receiving the energy reflected from the target, mixer means to which the received energy and a sample of the transmitted energy are fed for producing a first output signal having a frequency spectrum dependent upon target distance, and means including a frequency discriminator to which the said first output signal is fed for producing a second output signal indicative of distance.

2. A noise-modulated radio proximity fuze comprising in combination: a transmitter radiating energy towards a target, a source of white noise having a gaussian probability distribution of amplitudes with a mean amplitude of zero and a predetermined peak-to-peak noise voltage, a linear frequency shaping network connected to said source to frequency-shape said noise to a predetermined frequency spectrum, means connecting said network to said transmitter so that the frequency-shaped noise linearly frequency modulates said transmitter, means for receiving the energy reflected from the target, mixer means to which the received energy and a sample of the transmitted energy are fed, said mixer means producing a signal which is the instantaneous difference-frequency between transmitted and received energy and in which the frequency spectrum of the mixer output signal is dependent upon target distance, amplifier means connected to the output of said mixer means for amplifying the mixer output signal, discriminator means connected to the output of said amplifier for producing an output signal which is a distance correlation of the frequency spectrum of the mixer output signal, firing circuit means connected to the output of said discriminator means, said firing circuit means producing a firing pulse when the output of said discriminator means corresponds to a predetermined firing distance, and detonation means connected to the output of said firing circuit means so as to provide detonation when said firing circuit produces a firing pulse.

3. The invention in accordance with claim 2 wherein said linear frequency shaping network is a linear gaussian filter, wherein said discriminator means is a clip and count type of discriminator having a linear output voltage-input frequency relation, and wherein said firing circuit means is a comparison and firing circuit which produces a firing pulse when the output of said clip and count type of discriminator has a predetermined value.

4. The invention in accordance with claim 3 wherein said linear frequency shaping network is a linear band pass filter, wherein said discriminator means is a spectrum-ratio type of discriminator having two tuned circuits, and wherein said firing circuit means is a circuit which produces a firing pulse when the output of said spectrum-ratio type of discriminator passes through crossover.

5. A system for measuring time delay comprising means for producing a random noise function, means for transmitting a signal modulated by said random noise function, a transmission medium means for imparting time delay for signals passing therethrough, means for coupling said transmitted signal to said transmission medium, means for receiving said coupled signal which has undergone a time delay, means for comparing said transmitted signal with the said received signal, means for producing an output signal in response to said comparison and means for presenting said output signal to indicate the magnitude of said time delay.

6. A system for measuring time delay comprising means for producing a random noise function, means for transmitting a signal modulated by said random noise function, a transmission medium means for imparting time delay for signals passing therethrough, means for coupling said transmitted signal to said transmission medium, means for receiving said coupled signal which has undergone a time delay, means for correlating the signal being transmitted with the received signal, and means for indicating the degree of correlation between said transmitted signal and said received signal.

7. A system for determining time delay of a signal in a transmission medium comprising a transmitter for a signal which can be modulated in amplitude, means for generating a random noise function, means for impressing said random noise function so as to modulate the amplitude of said transmitted signal, means for coupling said transmitted signal into a propagating medium, means for receiving said coupled signal, amplifying means connected to said receiving means for amplifying said coupled signal, means for computing the autocorrelation of said transmitted and said received signals, and means for indicating the degree of autocorrelation.

8. A system for measuring time delay of a reflected signal comprising means for transmitting a signal capable of being modulated in frequency, means for modulating the frequency of said signal with random noise, means for coupling the random noise modulated output signal of said transmitter into a transmission medium which imparts a time delay thereto, means for receiving a returned time-delayed version of said coupled signal through said medium, amplifying means connected to said receiving means for amplifying said returned signal, means for computing the autocorrelation of said transmitted and said returned signals, and means for indicating the degree of autocorrelation.

9. A system for determining time delay of a signal in a transmission medium comprising a transmitter for a signal which can be modulated in frequency, means for modulating the frequency of said signal with random noise, means for coupling the random noise modulated output signal of said transmitter into a transmission medium which imparts a time delay thereto, means for receiving a returned time-delayed version of said coupled signal through said medium, means for mixing said time-delayed signal with said transmitted signal connected to said receiving means and said transmitter, said mixing means producing a signal whose frequency is representative of the difference frequency of said time-delayed signal and said transmitted signal.

10. The system of claim 9 including means for presenting said differency frequency as a distance measurement.

11. A system for determining time delay of a signal in a transmission medium comprising a transmitter for a signal which can be modulated in frequency, means for modulating the frequency of said signal with random noise, means for coupling the random noise modulated output signal of said transmitter into a transmission medium which imparts a time delay thereto, means for receiving said coupled signal that has undergone a time delay, mixer means having two inputs, one of said inputs connected to receive said transmitted signal from said transmitter and the second of said inputs connected to receive said coupled, time delayed signal from said receiver, the output of said mixer means being representative of the average magnitude of the difference of the transmitted and the received signals.

12. The system of claim 11 including means for presenting said difference frequency as a distance measurement.

13. In a system for measuring distance, means for transmitting a signal, means for frequency modulating said signal with random noise, means for coupling said modulated signal from said transmitter to a transmitting medium which imparts a time delay to signals passing therethrough, means for receiving said signal from said transmitting medium, means connected to said transmitting means and said receiving means for mixing said transmitted signal and said received signal to produce a difference signal, filtering means connected to said mixing means to receive said difference signal, the output of said filtering means being a known function of the spectrum of the difference signal indicating the delay time to which the received signal has been subjected whereby said difference signal provides a correlation of the transmitted and received signals to effect distance measurement.

* * * * *

UNITED STATES PATENT OFFICE
CERTIFICATE OF CORRECTION

Page 1

Patent No. 3,781,884  Dated December 25, 1973

Inventor(s) Billy M. Horton

It is certified that error appears in the above-identified patent and that said Letters Patent are hereby corrected as shown below:

Title page, add:

[73] Assignee: The United States of America as represented by the Secretary of the Army, Title page, line [76], change "Rensington" to --Kensington--.

Title page, Column 1, change attorney's name "Ratondi" to --Rotondi--.

Figures 1 to 5 (one sheet) are replaced by attached Figures 1 to 3 (3 sheets).

Signed and sealed this 17th day of December 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,781,884　　　　　　　　　Dated　December 25, 1973

Inventor(s) Billy M. Horton

It is certified that error appears in the above-identified patent and that said Letters Patent are hereby corrected as shown below:

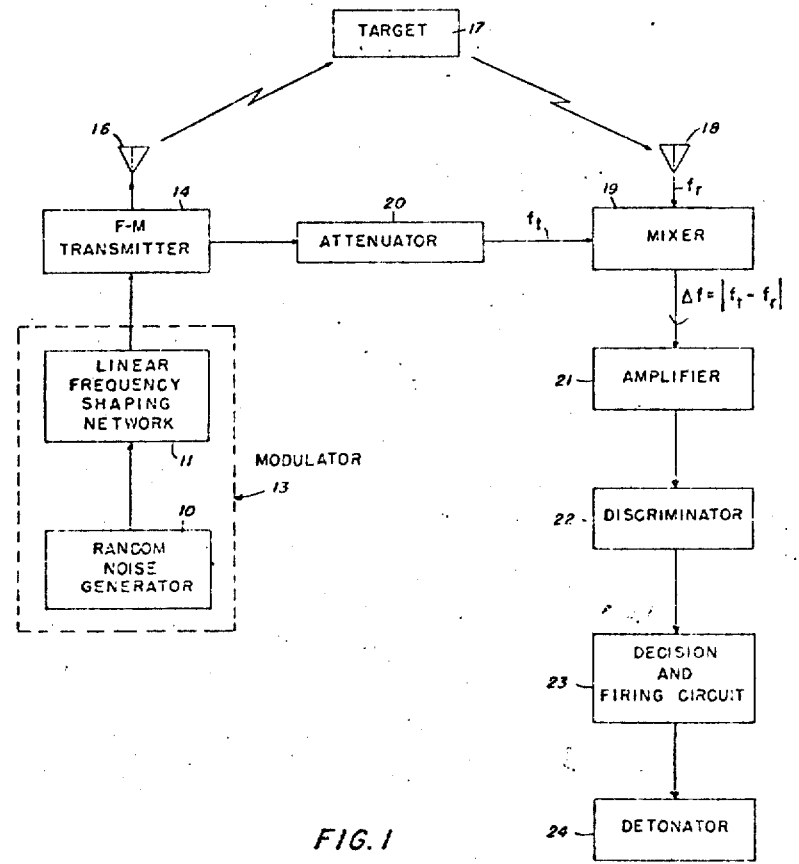

UNITED STATES PATENT OFFICE
CERTIFICATE OF CORRECTION

Page 3

Patent No. 3,781,884                         Dated December 25, 1974

Inventor(s) Billy M. Horton

It is certified that error appears in the above-identified patent and that said Letters Patent are hereby corrected as shown below:

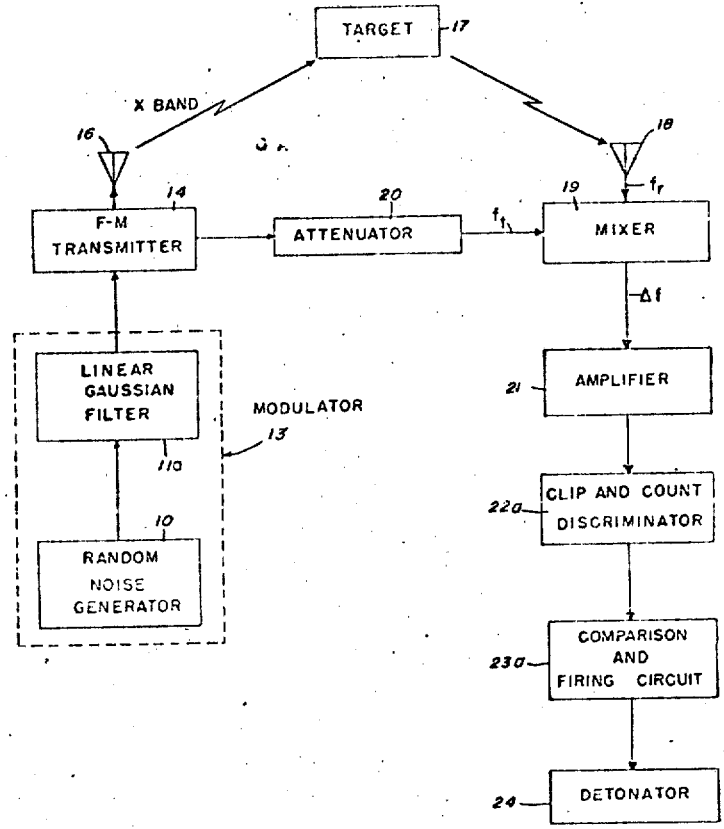

FIG. 2

UNITED STATES PATENT OFFICE
CERTIFICATE OF CORRECTION

Patent No. 3,781,884        Dated December 25, 1973

Inventor(s) Billy M. Horton

It is certified that error appears in the above-identified patent and that said Letters Patent are hereby corrected as shown below: